United States Patent [19]

Brackenridge

[11] 3,901,834

[45] Aug. 26, 1975

[54] FLAME RETARDANT POLYURETHANE FOAMS

[75] Inventor: David R. Brackenridge, Royal Oak, Mich.

[73] Assignee: Ethyl Corporation, Richmond, Va.

[22] Filed: Mar. 26, 1973

[21] Appl. No.: 344,527

[52] U.S. Cl. .................... 260/2.5 AJ; 260/45.7 R
[51] Int. Cl. ..................... C08g 22/44; C08g 51/58
[58] Field of Search .................. 260/2.5 AJ, 45.7

[56] References Cited
UNITED STATES PATENTS

| | | | |
|---|---|---|---|
| 2,028,715 | 1/1936 | Hanson | 252/8.1 |
| 3,067,150 | 12/1962 | Dombrow | 260/45.7 R |
| 3,259,593 | 7/1966 | Eichhorn | 260/2.5 AJ |
| 3,422,047 | 1/1969 | Cannelongo | 260/28.5 |
| 3,660,321 | 5/1972 | Practzel | 260/2.5 AJ |
| 3,738,953 | 6/1973 | Anorga | 260/2.5 AJ |

FOREIGN PATENTS OR APPLICATIONS 994,087   6/1965   United Kingdom ........... 260/2.5 AJ

OTHER PUBLICATIONS

Journal American Chemical Soc., Vol. 68, (1946), pp. 424–425.

*Primary Examiner*—Donald E. Czaja
*Assistant Examiner*—C. Warren Ivy
*Attorney, Agent, or Firm*—Donald L. Johnson; Robert A. Linn

[57] ABSTRACT

Polyurethane foams can be made with enhanced flame retardancy by incorporation of a flame retardant amount of a tetrabrominated xylene.

6 Claims, No Drawings

FLAME RETARDANT POLYURETHANE FOAMS

BACKGROUND OF THE INVENTION

Polyurethane foams have been made flame retardant with various additives; confer for example, page 66 of "Rigid Plastic Foams," T. H. Ferrigno, Reinhold Publishing Corp., New York, N.Y. (1963).

Likewise, U.S. Pat. No. 3,041,293 teaches use of tris-2-(1,3-dichloropropyl)phosphate as a flame retardant.

Polyurethane foams containing halogen containing polymers are made flame retardant with zinc oxide (French process) and antimony oxide; U.S. Pat. No. 3,574,149. Use of phosphate containing plasticizers to enhance flame retardancy of polyvinyl halide containing foams is set forth in U.S. Pat. Nos. 3,338,845 and 3,409,580.

So far as is known, use of tetrabrominated xylenes as flame retardants for urethane foams has not been reported in the prior art.

SUMMARY OF THE INVENTION

A polyurethane foam produced by reaction of an organic polyisocyanate and a polymer selected from the class consisting of hydroxyl-terminated polyethers and hydroxyl terminated polyesters and having incorporated therein a flame retardant amount of a tetrabrominated xylene i.e.

$$Br_4 - \phantom{x} - (CH_3)_2$$

In a process for preparing a polyurethane foam in which a foaming agent, an organic polyisocyanate, and a polymer selected from the class consisting of hydroxyl-terminated polyesters, and hydroxyl-terminated polyethers, are mixed and reacted to form a foam, the improvement which comprises adding a tetrabrominated xylene to the mixture to be foamed, whereby flame retardancy of the resultant foam is improved.

DESCRIPTION OF PREFERRED EMBODIMENTS

Polyurethane foams are formed from compositions comprising
i. a polymer containing free hydroxyl groups such as hydroxyl-terminated polyesters or hydroxyl-terminated polyethers,
ii. a polyisocyanate, and
iii. a foaming agent.

Usually, other materials are added to the composition to be foamed such as
iv. catalysts,
v. plasticizers, and
vi. emulsifiers,
for example.

The polyesters may be derived from a reaction product of a dicarboxylic acid such as adipic acid, and a dihydric alcohol such as ethylene glycol, and may be modified by a material such as trimethylolpropane; confer pages 20–21 of Ferrigno, supra.

The polyethers are ethylene oxide and propylene oxide adducts of polyhydric alcohols and are described on pages 10–19 of Ferrigno, supra.

Polyisocyanates which can be used are described in U.S. Pat. No. 3,574,149, supra; confer the paragraph bridging columns 3 and 4. Another description of exemplary isocyanates is in U.S. Pat. No. 3,338,846, in the first two paragraphs of Column 8.

Foaming agents such as water and urethanes described from tertiary alcohols are known; confer U.S. Pat. No. 3,338,846. Fluorocarbon blowing agents are described in U.S. Pat. No. 3,574,149.

For the other ingredients which can be added to make rigid or flexible polyurethane foams, reference is also made to U.S. Pat. Nos. 3,338,845, 3,338,846, and 3,574,149, all cited above, and incorporated by reference herein as if fully set forth.

For the invention, a fire retardant amount of tetrabromo-p-xylene, tetrabromo-p-xylene, or tetrabromo-m-xylene, or mixture thereof is incorporated in the formulations. In general from about 2 to 40 parts by weight per each 100 parts by weight polyol, and more preferably from 5 to 25 parts per 100 parts by weight polyol are used, it being understood that greater or lesser quantities can be used as desired.

The exact nature of the polyurethane foam or the ingredients admixed to prepare the foam are not critical, since the fire retardancy of the additives is not unduly restricted by the foams or the ingredients from which they are made.

EXAMPLE I

To each of three separate batches of 100 grams of polyoxypropylene polyol (Pluracol GP-3030) having an average molecular weight of 2920 and a hydroxyl number of 56, were added 1.0 gram silicone surfactant (Dow Corning 192), 0.3 gram tertiary amine blowing catalyst (DABCO 33-LV), and 4.0 grams distilled water. To two of the above dispersions were added 10.0 grams and 15.0 grams of tetrabromo-p-xylene. No flame retardants were added to the third dispersion. DABCO 33-LV is a trade mark of Houdry Process and Chemical Company for a composition containing one part by weight of triethylene diamine and two parts of dipropylene glycol.

Each of the above dispersions were mixed thoroughly for 10 seconds. Next, 0.2 grams of stannous octoate catalyst were added and mixed for 5 seconds. Next, 50.0 grams of an 80:20 blend of the 2,4- and 2,6-isomers of toluene diisocyanate were added and stirred rapidly for 10 seconds or until creaming was noted. The resulting admixtures were poured into 8 × 8 × 4 inch boxes and allowed 3–5 minutes for the foaming reaction to take place. Then the foams were placed in an oven and cured for 30 minutes at about 120°C.

The foams were then removed from the oven, aged for seven days at ambient temperature, and cut into test specimens for flammability testing in accordance with ASTM-D-1692-59T.

The foam recipes and test results are shown below.

| Materials | Foam A g | Foam B g | Foam C g |
| --- | --- | --- | --- |
| Polyol GP-3030 | 100 | 100 | 100 |
| Surfactant 192 | 1 | 1 | 1 |
| DABCO 33-LV | 0.3 | 0.3 | 0.3 |
| Stannous octoate | 0.2 | 0.2 | 0.2 |
| Distilled water | 4 | 4 | 4 |
| Toluene diisocyanate, 80:20 | 50 | 50 | 50 |
| Tetrabromo-p-xylene | — | 10 | 15 |
| Foam density, pcf | 1.61 | 1.70 | 1.90 |

ASTM D-1692-59T Results

| Foam | Self Extinguishing Time, Seconds | Distance Burned, In. | Rate of Burning In./Min. |
|---|---|---|---|
| A | — | 5.0 | 7.0 |
| B | 45 | 3.0 | 4.0 |
| C | — | 5.0 | 3.2 |

Likewise, foams with improved flame retardancy can be made when the corresponding tetrabromo-o-xylene, and tetrabromo-m-xylene are used in an amount of from 5 to 25 parts per each 100 parts of hydroxylated polymer. Similar results are obtained when tetrabromo-p-xylene is used in an amount of from 5 to 25 parts per each 100 parts of hydroxy containing polymer.

Similar results are obtained when the molecular weight of the hydroxy-terminated polymer has an average molecular weight of from about 1250 to about 2800.

Similar results are obtained when the above amounts of tetrabromoxylenes are added to the compositions of Examples 1–15 of U.S. Pat. No. 3,338,846, and the compositions of Examples 1–24 of U.S. Pat. Nos. 3,338,845 and 3,409,580.

Similar results are obtained when the isocyanate is an 80/20 mixture of 2,4/2,6 tolylene diisocyanate or a p,p'-diphenylmethane diisocyanate or PAPI.

Similar results are obtained when the foaming agent is trichlorofluoromethane or dichlorodifluoromethane.

I claim

1. A polyurethane foam produced by reaction of an organic polyisocyanate and a polymer selected from the class consisting of hydroxyl-terminated polyethers and hydroxy-terminated polyesters and having incorporated therein a flame retardant amount of a tetrabrominated xylene of the formula

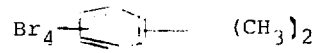

2. A foam of claim 1 wherein said polymer is a hydroxy-terminated polyether.

3. A foam of claim 1 wherein said tetrabrominated xylene is tetrabromo-p-xylene.

4. In a process for preparing a polyurethane foam in which a foaming agent, an organic polyisocyanate, and a polymer selected from the class consisting of hydroxyl-terminated polyesters, and hydroxy-terminated polyethers, are mixed and reacted to form a foam, the improvement which comprises adding a tetrabrominated xylene to the mixture to be foamed, whereby flame retardancy of the resultant foam is improved.

5. A process of claim 4 wherein said polymer is hydroxyl-terminated polyether.

6. A process of claim 4 wherein said xylene is tetrabromo-p-xylene.

* * * * *

UNITED STATES PATENT AND TRADEMARK OFFICE
CERTIFICATE OF CORRECTION

PATENT NO. : 3,901,834
DATED : August 26, 1975
INVENTOR(S) : David R. Brackenridge It is certified that error appears in the above-identified patent and that said Letters Patent are hereby corrected as shown below:

Column 2, lines 12-13, "tetrabromo-p-xylene" (first occurrence) should read -- tetrabromo-o-xylene --

Signed and Sealed this twenty-fifth Day of November 1975

[SEAL]

Attest:

RUTH C. MASON
Attesting Officer

C. MARSHALL DANN
Commissioner of Patents and Trademarks